(12) United States Patent
Nagashima et al.

(10) Patent No.: US 6,286,906 B1
(45) Date of Patent: Sep. 11, 2001

(54) BALANCE WEIGHT

(75) Inventors: Keizou Nagashima, Saitama; Osamu Hidekawa, Kanagawa; Satoshi Komazaki, Kanagawa; Hideo Koike, Kanagawa, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/533,797

(22) Filed: Mar. 24, 2000

(30) Foreign Application Priority Data

Mar. 25, 1999 (JP) .................................................. 11-082275

(51) Int. Cl.[7] ...................................................... B60B 1/00
(52) U.S. Cl. ............................................................. 301/5.21
(58) Field of Search ................................... 301/5.21, 5.22

(56) References Cited

U.S. PATENT DOCUMENTS

| | | | |
|---|---|---|---|
| 2,640,727 | 6/1953 | Kennedy . | |
| 3,177,039 | * 4/1965 | Skidmore | 301/5.21 |
| 3,905,648 | * 9/1975 | Skidmore | 301/5.21 |
| 3,960,409 | 6/1976 | Songer . | |
| 4,379,596 | 4/1983 | Green et al. . | |
| 4,720,149 | 1/1988 | Thissen et al. . | |

FOREIGN PATENT DOCUMENTS

| | | |
|---|---|---|
| 0 143 200 | 6/1985 | (EP) . |
| 0 771 967 | 5/1997 | (EP) . |
| 2 781 196 | 1/2000 | (FR) . |
| 3051328 | 6/1998 | (JP) . |

* cited by examiner

*Primary Examiner*—S. Joseph Morano
*Assistant Examiner*—Long Bao Nguyen
(74) *Attorney, Agent, or Firm*—Foley & Lardner

(57) ABSTRACT

A balance weight for providing a balance has 1) a central portion, 2) first and second side portions interposing therebetween the central portion such that the first side portion, the central portion and the second side portion are continuously arranged in a direction, 3) a first weight block contained in the first side portion, which first weight block is adjacent to the central portion and has a first width, 4) a second weight block contained in the second side portion, which second weight block is adjacent to the central portion and has a second width, 5) at least one index weight block for indicating a center of the balance weight in the direction, which at least one index weight block is contained in the central portion and has a third width that is shorter than each of the first and second widths, and 6) a base member for uniting together the first and second weight blocks and the at least one index weight block, which base member is made of a flexible material.

With this balance weight having the at least one index weight block, an assembly worker can easily find the center of the balance weight, thus improving workability.

19 Claims, 6 Drawing Sheets

FIG.4

| No. | MASS | COMBINATION |
|---|---|---|
| 1 | 5 g | 5 |
| 2 | 10 g | 10 |
| 3 | 15 g | 5 \| 5 \| 5 |
| 4 | 20 g | 10 \| 10 |
| (5) | 25 g | 10 \| 5 \| 10 |
| 6 | 30 g | 10 \| 10 \| 10 |
| (7) | 35 g | 10 \| 5 \| 5 \| 5 \| 10 |
| 8 | 40 g | 10 \| 10 \| 10 \| 10 |
| (9) | 45 g | 10 \| 10 \| 5 \| 10 \| 10 |
| (10) | 50 g | 10 \| 10 \| 5 \| 5 \| 10 \| 10 |
| (11) | 55 g | 10 \| 10 \| 5 \| 5 \| 5 \| 10 \| 10 |
| (12) | 60 g | 10 \| 10 \| 5 \| 5 \| 5 \| 5 \| 10 \| 10 |
| (13) | 65 g | 10 \| 10 \| 10 \| 5 \| 10 \| 10 \| 10 |
| (14) | 70 g | 10 \| 10 \| 10 \| 5 \| 5 \| 10 \| 10 \| 10 |
| (15) | 75 g | 10 \| 10 \| 10 \| 5 \| 5 \| 5 \| 10 \| 10 \| 10 |
| (16) | 80 g | 10 \| 10 \| 10 \| 5 \| 5 \| 5 \| 5 \| 10 \| 10 \| 10 |
| (17) | 85 g | 10 \| 10 \| 10 \| 10 \| 5 \| 10 \| 10 \| 10 \| 10 |
| (18) | 90 g | 10 \| 10 \| 10 \| 10 \| 5 \| 5 \| 10 \| 10 \| 10 \| 10 |
| (19) | 95 g | 10 \| 10 \| 10 \| 10 \| 5 \| 5 \| 5 \| 10 \| 10 \| 10 \| 10 |
| (20) | 100 g | 10 \| 10 \| 10 \| 10 \| 5 \| 5 \| 5 \| 5 \| 10 \| 10 \| 10 \| 10 |
| (21) | 105 g | 10 \| 10 \| 10 \| 10 \| 5 \| 5 \| 5 \| 5 \| 10 \| 10 \| 10 \| 10 |

FIG.5

| No. | MASS | COMBINATION | | | | | | |
|---|---|---|---|---|---|---|---|---|
| 1 | 35 g | 15 | 5 | 15 | | | | |
| 2 | 40 g | 15 | 10 | 15 | | | | |
| 3 | 50 g | 15 | 10 | 10 | 15 | | | |
| 4 | 55 g | 15 | 10 | 5 | 10 | 15 | | |
| 5 | 65 g | 15 | 15 | 5 | 15 | 15 | | |
| 6 | 70 g | 15 | 15 | 10 | 15 | 15 | | |
| 7 | 75 g | 15 | 15 | 5 | 5 | 5 | 15 | 15 |
| 8 | 80 g | 15 | 15 | 10 | 10 | 15 | 15 | |
| 9 | 85 g | 15 | 15 | 10 | 5 | 10 | 15 | 15 |
| 10 | 90 g | 15 | 15 | 10 | 5 | 5 | 10 | 15 | 15 |
| 11 | 95 g | 15 | 15 | 15 | 5 | 15 | 15 | 15 |
| 12 | 100 g | 15 | 15 | 15 | 10 | 15 | 15 | 15 |

FIG.6

| No. | MASS | COMBINATION | | | | |
|---|---|---|---|---|---|---|
| 1 | 30 g | 12.5 | 5 | 12.5 | | |
| 2 | 35 g | 12.5 | 10 | 12.5 | | |
| 3 | 40 g | 12.5 | 5 5 5 | 12.5 | | |
| 4 | 45 g | 12.5 | 10 | 10 | 12.5 | |
| 5 | 50 g | 12.5 | 10 | 5 | 10 | 12.5 |
| 6 | 55 g | 12.5 | 12.5 | 5 | 12.5 | 12.5 |
| 7 | 60 g | 12.5 | 12.5 | 10 | 12.5 | 12.5 |

FIG.7

| No. | MASS | COMBINATION |
|---|---|---|
| 1 | 80 g | 10 10 10 5 10 5 10 10 10 |
| 2 | 95 g | 10 10 10 5 10 5 10 5 10 10 10 |

BALANCE WEIGHT

BACKGROUND OF THE INVENTION

The present invention relates to a balance weight which is adhered to a wheel of an automobile.

For correcting an unbalanced condition of a tire wheel, a balance weight such as the one made of lead has been used. Contrary to this practice, non-lead balance weight is required for an enhanced natural environment protection in recent years. Iron is the one that has replaced lead. However, use of iron does not permit deforming the balance weight in accordance with the radius of curvature of the tire wheel. Namely, balance weights made of iron cannot be commonly used for various tire wheels having different radii.

DESCRIPTION OF THE PRIOR ART

Japanese Registered Utility Model Publication No. 3051328 describes a balance weight having weight blocks.

SUMMARY OF THE INVENTION

It is an object of the present invention to provide a balance weight having at least one index weight block for indicating easily the center of the balance weight. It is another object of the present invention to provide a balance weight of which weight blocks are made of a material other than lead. It is still another object of the present invention to provide a balance weight that can be used for various tire wheels having different diameters. There is provided a balance weight for providing a balance, according to the present invention. The balance weight comprises 1) a central portion; 2) first and second side portions interposing therebetween the central portion such that the first side portion, the central portion and the second side portion are continuously arranged in a direction; 3) a first weight block contained in the first side portion, the first weight block being adjacent to the central portion and having a first width; 4) a second weight block contained in the second side portion, the second weight block being adjacent to the central portion and having a second width; 5) at least one index weight block for indicating a center of the balance weight in the direction, the at least one index weight block being contained in the central portion and having a third width that is shorter than each of the first and second widths; and 6) a base member for uniting together the first and second weight blocks and the at least one index weight block, the base member being made of a flexible material.

BRIEF DESCRIPTION OF THE DRAWINGS

FIG. 4 is a table showing combinations of weight blocks, containing those combinations according to the first preferred embodiment of the present invention;

FIG. 5 is a table showing combinations of weight blocks, according to a second preferred embodiment of the present invention;

FIG. 6 is a table showing combinations of weight blocks, according to a third preferred embodiment of the present invention;

FIG. 7 is a table showing combinations of weight blocks, according to a fourth preferred embodiment of the present invention.

DETAILED DESCRIPTION OF THE PREFERRED EMBODIMENT

Figure 1:
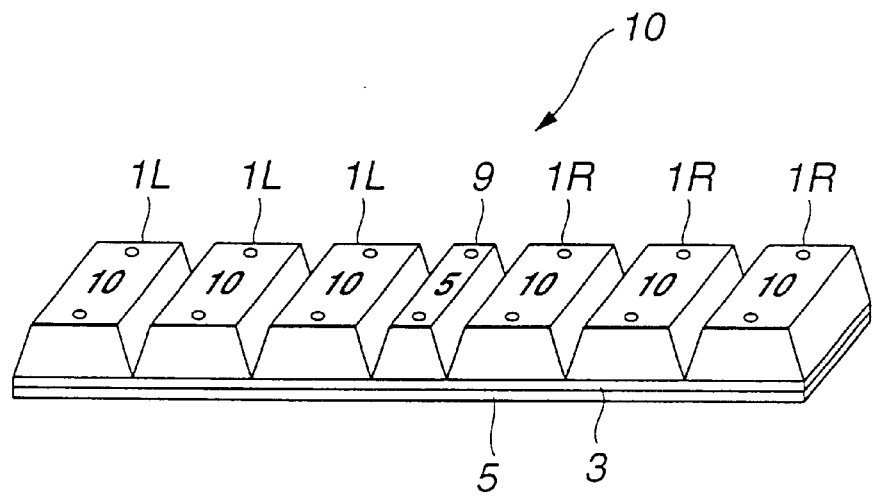
FIG. 1 is a perspective view of a balance weight according to a first preferred embodiment of the present invention.

FIG. 1 is a perspective view of a balance weight 10, according to a first preferred embodiment of the present invention.

In this embodiment, there are provided one index weight block 9 and three each of first and second weight blocks 1L and 1R. The index weight block 9 is contained in a central portion of the balance weight 10. Each of the weight blocks 9, 1L and 1R is made of a material other than lead, for example, iron. Moreover, each of the weight blocks 9, 1L and 1R has a section, when each of weight blocks 9, 1L and 1R is cut straight through in a direction in which they are arranged, having a shape such that a width of the section in the direction at a point decreases, as a distance between the point and the base member 3 increases. In this embodiment, the section is shaped into a trapezium having one pair of parallel sides. However, the shape of the section is not particularly limited. Other shapes such as triangle, mountain or half-moon are allowed.

The balance weight 10 has a base member 3 which is made of a flexible material such as a double-sided tape. The base member 3 has a first side to which an index weight block 9 and first and second weight blocks 1L and 1R are bonded, and a second side covered with a releasable paper 5.

Hereinafter, the first and second weight blocks 1L and 1R are referred to as other weight blocks 1.

In this embodiment, the index weight block 9 weighs 5 g, and each of the other weight blocks 1 weighs 10 g. The index weight block 9 is a half in width of each of the other weight blocks 1. The index weight block 9 works for indicating the center of the balance weight 10 in the direction.

Figure 2A:
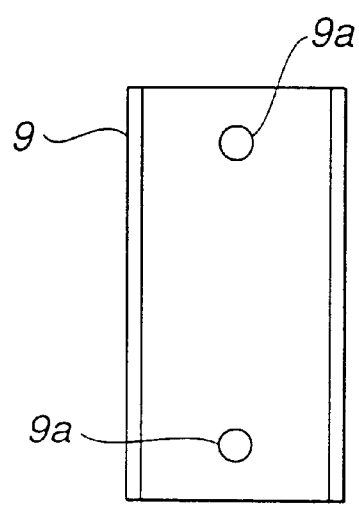
FIG. 2(a) is a top view of an index weight block of the balance weight in FIG. 1.
Figure 2B:
FIG. 2(b) is a side view of the index weight block of FIG. 2(a)

Moreover, as is seen in FIG. 2(a), the index weight block 9 has on an upper surface thereof a mark 9a for indicating a center of the width of the index weight block 9, and thus indicating the center of the balance weight 10 since the index eight block 9 is positioned at the center of the balance weight 10. The mark 9a is a dented mark.

Figure 3A:
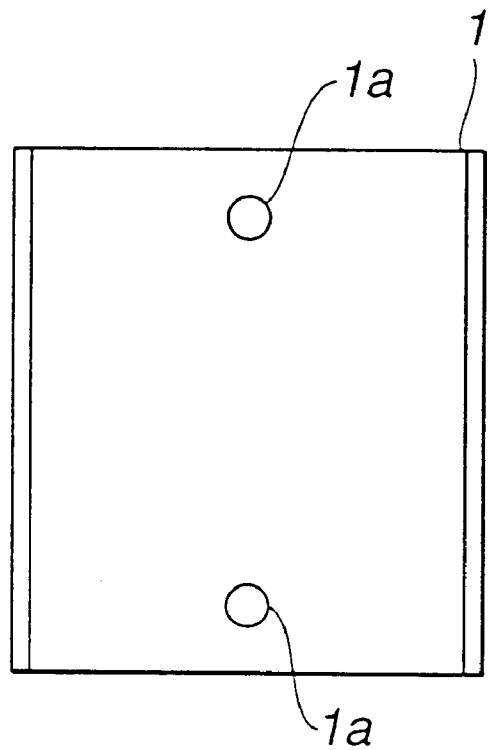
FIG. 3(a) is a top view of one of first and second weight blocks of the balance weight in FIG. 1.
Figure 3B:
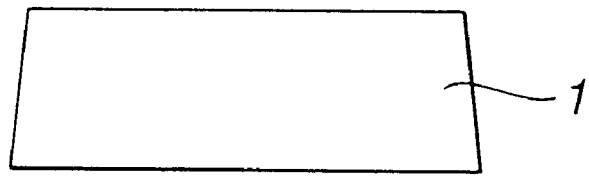
FIG. 3(b) is a side view of one of first and second weight blocks of FIG. 3(a)

As is seen in FIGS. 1 and 3(a), each of the other weight blocks 1 has a mark 1a. In this embodiment, the mark 1a is not used for indicating the center of the balance weight 10. Use of the mark 1a for indicating the center of the balance weight is to be stated in the aftermentioned second and third embodiments.

Figure 8:
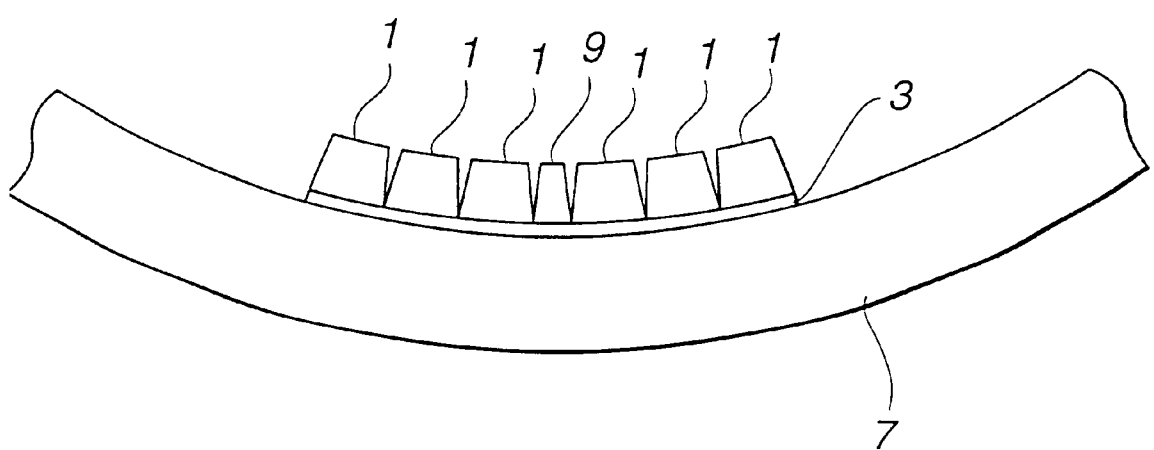
FIG. 8 is a side view showing a condition in which the balance weight in FIG. 1 is mounted on an automobile wheel.

As shown in FIG. 8, the balance weight 10 is mounted on a tire wheel 7 in such a manner that an assembly worker releases the paper 5, and then allows the center of the balance weight 10 to mate with a point which has been predetermined by balancing. Thereafter, the balance weight is bonded to the tire wheel by the assembly worker.

Having the index weight block 9 and the other weight blocks 1 that are united together in series by the base member 3, the balance weight 10 can be mounted accurately and with case on various tire wheels having different curvatures. The mark 9a on an upper surface of the weight block 9 helps the assembly worker mount the balance weight 10 accurately and easily.

FIG. 4 shows combinations of the weight blocks 9 and 1 which are united in series on the base member 3. When the central portion consists of an even number of index weight blocks 9, the total number of weight blocks of the balance weight 10 is even in number. Alternatively, when the central portion consists of an odd number of index weight blocks 9, the total number of weight blocks of the balance weight 10 is odd in number.

For example, in the case of No. 5, the total number of weight blocks is three, namely, an odd number. Therefore, the number of index weight blocks 9 is one, namely, an odd number. The same is true of No. 7, No. 9, No. 11, No. 13, No. 15, No. 17, No. 19, and No. 21. For another example, in the case of No. 10, the total number of weight blocks is six, namely, an even number. Therefore, the number of index blocks 9 is an even number, two. The same is true of No. 12, No. 14, No. 16, No. 18 and No. 20.

In any of the combinations in FIG. 4, the central portion of the series of the balance weight 10 becomes easy to identify with the index weight block 9 whether singular or plural. As is exemplified by No. 13 in FIG. 4 which corresponds to a combination of weight blocks of FIG. 1, the index weight block 9 that is one in number is identified such that the center of the series can be easily indicated as being the center line of the index weight block 9 between the marks 9a and 9a. When the index weight block 9 is odd and plural in number, the center of the series can be easily identified as being the center line of the index weight block 9 positioned in the middle of the central portion. When the index weight block 9 is even and plural in number, the boundary between two adjacent weight blocks 9, which are positioned in the middle of the central portion, can be identified as being the center of the balance weight 10.

Moreover, in FIG. 4, the index weight block 9 is five or less in number. By identifying a gathering of the index weight blocks 9, the assembly worker can accurately and easily determine the center of the balance weight 10. Although not shown in the drawings, the index weight block 9 can be made more than five in number. It should be noted that the weight block combinations No. 1, No. 2, No. 3, No. 4 No. 6 and No. 8 do not belong to the invention.

FIG. 5 shows a second preferred embodiment of the present invention, in which each of the index weight blocks 9 is one of 5 g and 10 g, and each of the other weight blocks 1 is 15 g or 10 g. The second embodiment is based on the same combinational concept as that of the first embodiment in FIG. 4. Namely, each of No. 1, No. 4, No. 5, No. 7, No. 9 and No. 11 has at least one index weight block 9 weighing 5 g for indicating the center of the balance weight 10, while each of No. 2, No. 6 and No. 12 has one index weight block 9 weighing 10 g for indicating the center of the balance weight 10. In No. 3 and No. 8, the boundary between two adjacent index weight blocks 9 each weighing 10 g works for indicating the center of the balance weight 10. Moreover, in No. 10, the boundary between two adjacent index weight blocks 9 each weighing 5 g works for indicating the center of the balance weight 10.

FIG. 6 shows a third preferred embodiment of the present invention, in which each of the index weight blocks 9 is one of 5 g and 10 g, and each of the other weight block 1 is 12.5 g or 10 g. The third embodiment is based on the same combinational concept as those of the first and second embodiments in FIGS. 4 and 5. In No. 1, No. 3, No. 5 and No. 6, each of the index weight blocks 9 weighing 5 g works for indicating the center of the balance weight 10. In No. 2 and No. 7, the index weight block 9 weighing 10 g works for indicating the center of the balance weight 10. In No. 4, the boundary between two adjacent index weight blocks weighing 10 g works for indicating the center of the balance weight 10. With these, adjusting and mounting the balance weight 10 on the tire wheel become so easy.

FIG. 7 shows a fourth embodiment of the present invention. This embodiment is unlike the aforementioned first, second and third embodiments. Namely, the central portion of the balance weight 10 contains at least one other weight block of 10 g each being interposed between two adjacent index weight blocks of 5 g. When the central portion contains an odd number of at least one other weight block, the total number of the index weight blocks is even in number. Alternatively, when the central portion contains an even number of at least one other weight block, the total of the index weight blocks is odd in number. For example, in the case of No. 1, an even number of index weight blocks of 5 g, namely two index weight blocks interpose therebetween one other weight block of 10 g. In the case of No. 2, an odd number of index weight blocks of 5 g, namely three index weight blocks 9 are contained in the central portion, both ends of the central portion are occupied by the index weight blocks of 5 g, and one other weight block of 10 g is interposed between the index weight blocks of 5 g. Therefore, in the case of No. 1, two index weight blocks 9 work for indicating the central portion of the series of the balance weight 10, and the one other weight block of 10 g interposed therebetween works for indicating the center of the series of the balance weight 10. With this, mounting the balance weight 10 becomes easy. Moreover in this case, putting the mark 1a on the one other weight block makes it easier to indicate the center of the balance weight 10, thus leading to still easier mounting. On the other hand, in the case of No. 2, three index weight blocks 9 work for indicating the central portion of the series of the balance weight 10, and the central index weight block 9 works for indicating the center of the series of the balance weight 10. With this, mounting the balance weight 10 becomes easy. Moreover in this case, putting the mark 9a on the central index weight block makes it easier to indicate the center of the balance weight 10, thus leading to still easier mounting. In FIG. 7, each of the other weight blocks interposed between two adjacent index weight blocks 5 g weighs 10 g. However, This weight is not particularly limited to 10 g. It can be 12.5 g, 15 g or the like.

The entire contents of Japanese Patent Application 11(1999)-82275 (filed Mar. 25, 1999) is incorporated herein by reference.

Although the invention has been described above by reference to certain embodiments of the invention, the invention is not limited to the embodiments described above. Modifications and variations of the embodiments described above will occur to those skilled in the art, in light of the above teachings.

The scope of the invention is defined with reference to the following claims.

What is claimed is:

1. A balance weight for providing a balance, the balance weight comprising:
   1) a central portion;
   2) first and second side portions interposing therebetween the central portion such that the first side portion, the central portion and the second side portion are continuously arranged in a direction;

3) a first weight block contained in the first side portion, the first weight block being adjacent to the central portion and having a first width;
4) a second weight block contained in the second side portion, the second weight block being adjacent to the central portion and having a second width;
5) at least one index weight block for indicating a center of the balance weight in the direction, the at least one index weight block being contained in the central portion and having a third width that is shorter than each of the first and second widths; and
6) a base member for uniting together the first and second weight blocks and the at least one index weight block, the base member being made of a flexible material.

2. A balance weight for providing a balance, the balance weight comprising:
1) a central portion;
2) first and second side portions interposing therebetween the central portion such that the first side portion, the central portion and the second side portion are continuously arranged in a direction;
3) a first weight block contained in the first side portion, the first weight block being adjacent to the central portion and having a first width;
4) a second weight block contained in the second side portion, the second weight block being adjacent to the central portion and having a second width;
5) at least one index weight block for indicating a center of the balance weight in the direction, the at least one index weight block being contained in the central portion and having a third width that is shorter than each of the first and second widths; and
6) a base member for uniting together the first and second weight blocks and the at least one index weight block, the base member being made of a flexible material wherein the first width of the first weight block, the second width of the second weight block, and the third width of the at least one index weight block are each defined in the direction, and the first and second widths are the same in length.

3. A balance weight according to claim 2, wherein a total number of weight blocks, including the first weight block, of the first side portion is the same as that of weight blocks, including the second weight block, of the second side portion.

4. A balance weight according to claim 2, wherein the central portion further contains at least one other weight block each being interposed between two of the at least one index weight block.

5. A balance weight according to claim 4, wherein the at least one other weight block contained in the central portion has a fourth width that is longer than the third width of the at least one index weight block, and the third and fourth widths are each defined in the direction.

6. A balance weight according to claim 2, wherein the central portion has first and second ends in the direction, the first end being occupied by one of the at least one index weight block, the second end being occupied by another of the at least one index weight block.

7. A balance weight according to claim 2, wherein each of the first and second weight blocks and the at least one index weight block has a section, when each of the first and second weight blocks and the at least one index weight block is cut straight through in the direction, the section having a shape such that a width of the section in the direction at a point decreases, as a distance between the point and the base member increases.

8. A balance weight according to claim 7, wherein the section is shaped into a trapezium having one pair of parallel sides.

9. A balance weight according to claim 2, wherein each of the first and second weight blocks and the at least one index weight blocks is made of a material other than lead.

10. A balance weight according to claim 2, wherein the base member is a double-sided tape having (1) a first side, to which the first and second weight blocks and the at least one index weight are bonded, and (2) a second side covered with a releasable paper.

11. A balance weight according to claim 2, wherein the central portion consists of the at least one index block.

12. A balance weight according to claim 11, wherein, when the central portion consists of an even number of the at least one index weight block, a total number of weight blocks, including the at least one index weight block and the first and second weight blocks, of the balance weight is an even number; and wherein, when the central portion consists of an odd number of the at least one index weight block, a total number of weight blocks, including the at least one index weight block and the first and second weight blocks, of the balance weight is an odd number.

13. A balance weight according to claim 4, wherein, when the central portion further contains an odd number of the at least one other weight block, a total number of the at least one index weight block is an even number; and wherein, when the central portion further contains an even number of the at least one other weight block, a total number of the at least one index weight block is an odd number.

14. A balance weight according to claim 13, wherein the at least one index weight block and the at least one other weight block are arranged in the direction, and the central portion has first and second ends in the direction, the first end of the central portion being occupied by one of the at least one index weight block, the second end of the central portion being occupied by another of the at least one index weight block.

15. A balance weight according to claim 11, wherein the at least one index weight block is five or less in number.

16. A balance weight according to claim 13, wherein the at least one index weight block is three or less in number.

17. A balance weight according to claim 11, wherein, when the central portion consists of an odd number of the at least one index weight block, one of the at least one index weight block, that is disposed at a center of the central portion, has a mark for indicating the center of the balance weight in the direction.

18. A balance weight according to claim 4, wherein, when the central portion further contains an odd number of the at least one other weight block, one of the at least one other weight block, that is disposed at a center of the central portion, has a mark for indicating the center of the balance weight in the direction; and, when the central portion further contains an even number of the at least one other weight block, one of the at least one index weight block, that is disposed at a center of the central portion, has a mark for indicating the center of the balance weight in the direction.

19. A balance weight according to claim 3, wherein the balance weight is divided into first and second halves by the center of the balance weight, and the first and second halves are the same in weight.

* * * * *